United States Patent
Park et al.

(10) Patent No.: US 7,205,925 B2
(45) Date of Patent: Apr. 17, 2007

(54) SEPARABLE RADAR DETECTOR

(75) Inventors: Jae Kyoo Park, Sungnam-si (KR);
Hyun Taek Lee, Kwangmyung-si (KR);
Dae Hyuk Kwon, Inchon (KR); Kyong Mi Lee, Buchon-si (KR)

(73) Assignee: BG T&A Co., Seoul (KR)

( * ) Notice: Subject to any disclaimer, the term of this patent is extended or adjusted under 35 U.S.C. 154(b) by 48 days.

(21) Appl. No.: 11/051,635

(22) Filed: Jan. 27, 2005

(65) Prior Publication Data
US 2005/0184902 A1    Aug. 25, 2005

(30) Foreign Application Priority Data
Jan. 28, 2004    (KR) .................. 10-2004-0005458

(51) Int. Cl.
H04K 3/00     (2006.01)
G01S 13/00    (2006.01)
G01S 7/00     (2006.01)

(52) U.S. Cl. .................. 342/20; 342/13; 342/175; 342/195

(58) Field of Classification Search .......... 342/13, 342/20, 89, 175, 195, 176
See application file for complete search history.

(56) References Cited

U.S. PATENT DOCUMENTS

| | | | | |
|---|---|---|---|---|
| 3,924,232 A * | 12/1975 | Burdi et al. | .......... | 342/20 |
| 4,700,191 A * | 10/1987 | Manor | .......... | 342/13 |
| 4,791,420 A * | 12/1988 | Baba | .......... | 342/20 |
| 4,801,938 A * | 1/1989 | Holmes | .......... | 342/20 |
| 4,818,997 A * | 4/1989 | Holmes | .......... | 342/20 |
| 4,952,937 A * | 8/1990 | Allen | .......... | 342/20 |
| 5,001,777 A * | 3/1991 | Liautaud | .......... | 342/20 |
| 5,111,207 A * | 5/1992 | Allen | .......... | 342/20 |

* cited by examiner

*Primary Examiner*—Bernarr E. Gregory
(74) *Attorney, Agent, or Firm*—Finnegan, Henderson, Farabow, Garrett & Dunner, L.L.P.

(57) ABSTRACT

The present invention relates to a separable radar detector, and more particularly, to a separable radar detector, wherein a horn antenna and a circuit for detection, and a display unit for displaying detected signals thereon are constructed to be moved, separated or rotated with respect to each other. The separable radar detector of the present invention comprises a horn antenna, a signal-processing unit for processing signals received by the horn antenna, an upper case for accommodating the horn antenna and the signal-processing unit, a lower case connected to the upper case to be relatively moved with respect thereto, and a display unit connected to the signal-processing unit and installed in the lower case to inform a user of the received signals processed by the signal-processing unit. According to the present invention, a large, flat display device can be employed and the angle of a display unit can be adjusted, thereby enabling a user to view the display unit in an optimum state and to utilize additional functions that are difficult to be implemented in conventional radar detectors.

7 Claims, 7 Drawing Sheets

SEPARABLE RADAR DETECTOR

BACKGROUND OF THE INVENTION

1. Field of the Invention

The present invention relates to a separable radar detector, and more particularly, to a separable radar detector, wherein a horn antenna and a circuit for detection, and a display unit for displaying detected signals thereon are constructed to be moved, separated or rotated with respect to each other so that a large, flat display device can be employed and the angle of the display unit can be adjusted, thereby enabling a user to view the display unit in an optimum state and to utilize additional functions that are difficult to be implemented in conventional radar detectors.

2. Description of the Related Art

In road traffic of vehicles and persons, there are always potential accident risks. Actually, a large number of accidents and risks occur even a day all over the country.

To promote safe travels of vehicles through notification of risks on roads, advanced countries have used safety alert systems or safety warning systems in which transmitters for transmitting risk information are installed at places where risks may occur and vehicles receive the risk information to cope with the risks.

Such safety alert systems for notifying road information transmit information on railroad crossings, construction works, emergency vehicles and the like. Such safety warning systems transmit coded information on foggy zones, construction works, school zones, deceleration and the like.

Accordingly, there have been developed and used radar detectors that receive signals transmitted from transmitters for safety warning, classify and process the signals, and then warn users, especially drivers, of risks corresponding to the signals.

Such a radar detector roughly comprises a horn antenna and a signal-processing unit. The horn antenna receives signals in frequency bands such as Ko, X, K, SWS and Ka bands. The signal-processing unit processes the signals received from the horn antenna and informs a user of the received signals.

FIG. 1 is a perspective view showing an example of a conventional radar detector. Such a radar detector comprising a horn antenna and a signal-processing unit is accommodated in a case 1 as shown in the figure. Received signals are visually displayed on a display unit 2 installed at a side opposite to the horn antenna.

Thus, the radar detector is used by attaching the case 1 to the inner side of a windshield of a vehicle using an additional attachment member.

However, since the display unit of the conventional radar detector is fixed only in one direction that is a direction opposite to the horn antenna, it is difficult for a user to view the display unit at a variety of angles. Further, since the display unit is small, there is a disadvantage in that the user cannot be sufficiently and effectively informed of received signals displayed on the display unit.

Moreover, due to such limitations on the display unit, there is a problem in that there are limitations on implementation and display of an additional function such as a GPS, a thermometer or a compass.

SUMMARY OF THE INVENTION

The present invention is conceived to solve the problems in the prior art. An object of the present invention is to provide a separable radar detector, wherein a large, flat display device can be employed and the angle of a display unit can be adjusted, thereby enabling a user to view the display unit in an optimum state and to utilize additional functions that are difficult to be implemented in conventional radar detectors.

The object of the present invention is achieved by a separable radar detector, comprising a horn antenna; a signal-processing unit for processing signals received by the horn antenna; an upper case for accommodating the horn antenna and the signal-processing unit; a lower case connected to the upper case to be relatively moved with respect thereto; and a display unit connected to the signal-processing unit and installed in the lower case to inform a user of the received signals processed by the signal-processing unit.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, preferred embodiments of the present invention will be described in detail with reference to the accompanying drawings.

Figure 1:
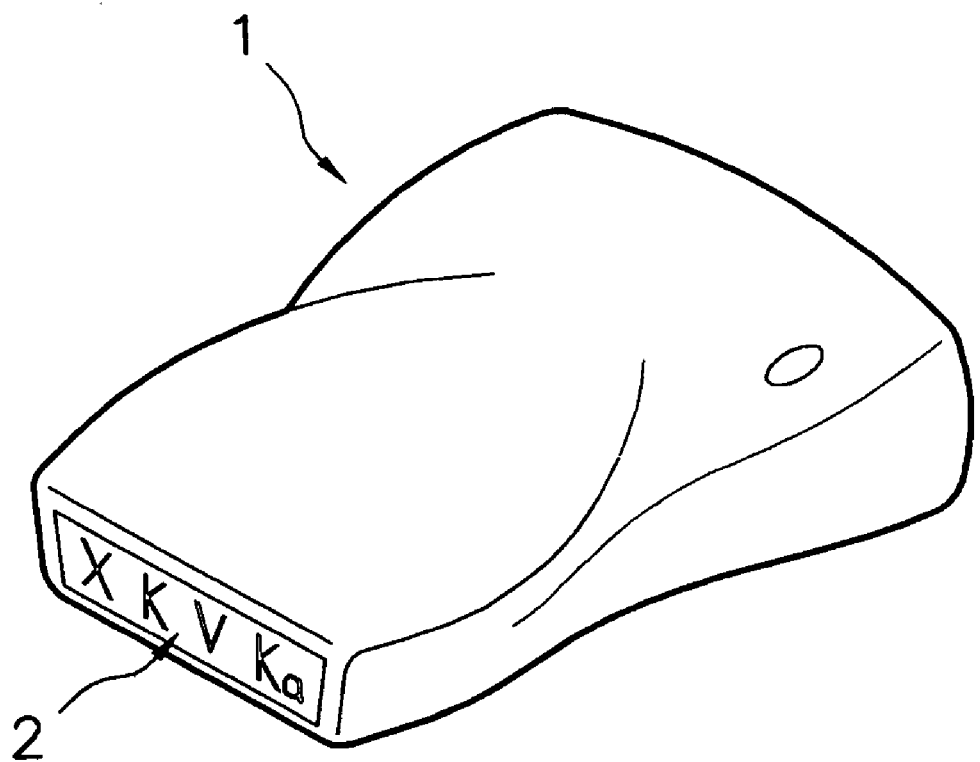
FIG. 1 is a perspective view showing an example of a conventional radar detector.
Figure 2:
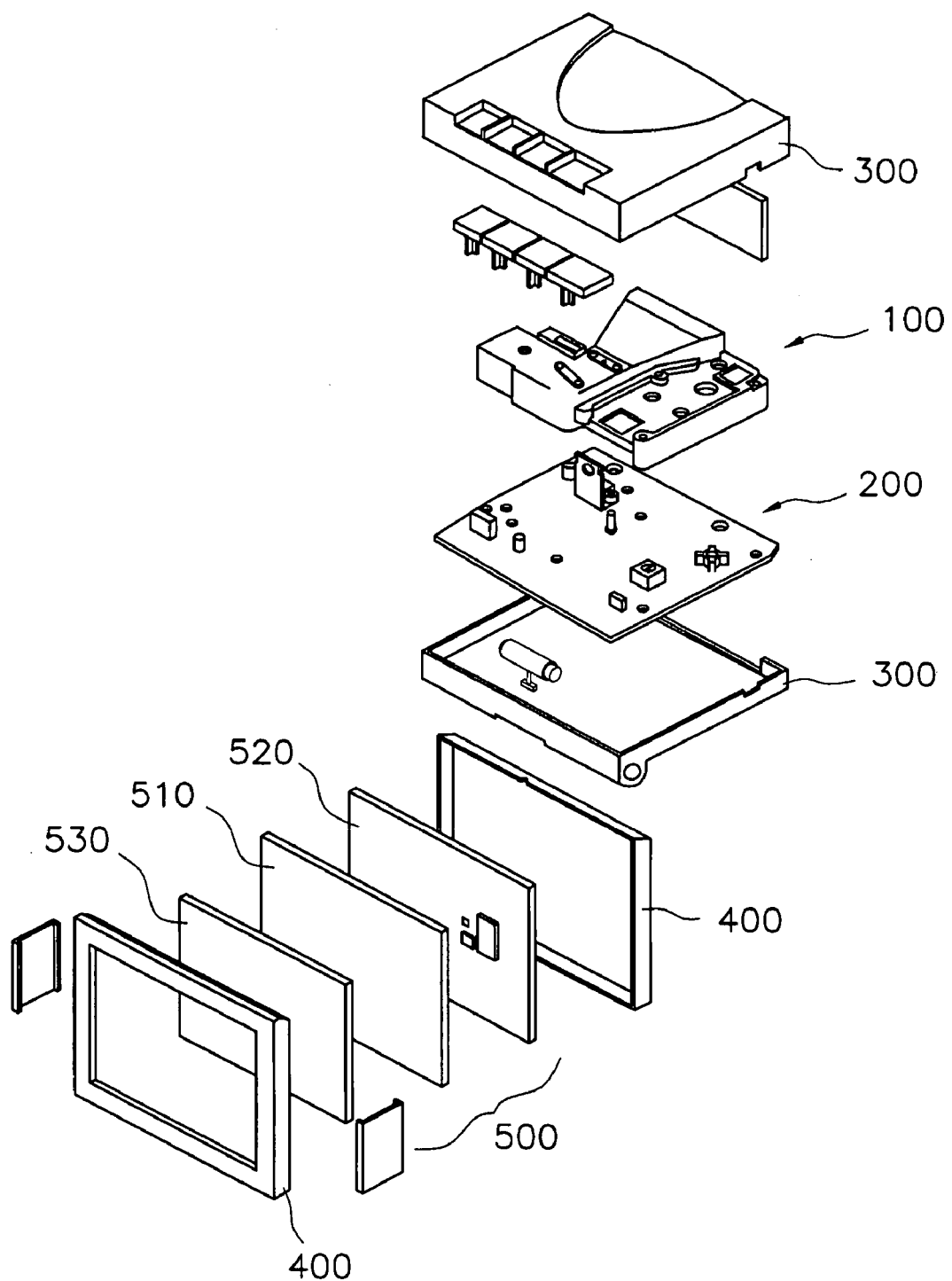
FIG. 2 is an exploded perspective view showing an embodiment of a separable radar detector according to the present invention.

FIG. 2 is an exploded perspective view showing an embodiment of a separable radar detector according to the present invention. The separable radar detector of the present invention comprises a horn antenna 100, a signal-processing unit 200 for processing signals received by the horn antenna 100, an upper case 300 for accommodating the horn antenna 100 and the signal-processing unit 200, a lower case 400 connected to the upper case 300 to be relatively moved with respect thereto, and a display unit 500 connected to the signal-processing unit 200 and installed in the lower case 400 to inform a user of the received signals processed by the signal-processing unit 200.

The display unit 500 employs a flat display device. Alternatively, a variety of flat display devices such as a liquid crystal display (LCD) including light-emitting diodes (LEDs) and an organic electroluminescence (OEL) display device may be employed. However, the display unit 500 of this embodiment comprises an LCD 510, a controller 520 for driving the LCD 510, and a window 530 positioned over the LCD 510 to protect the LCD 510.

Figure 3:
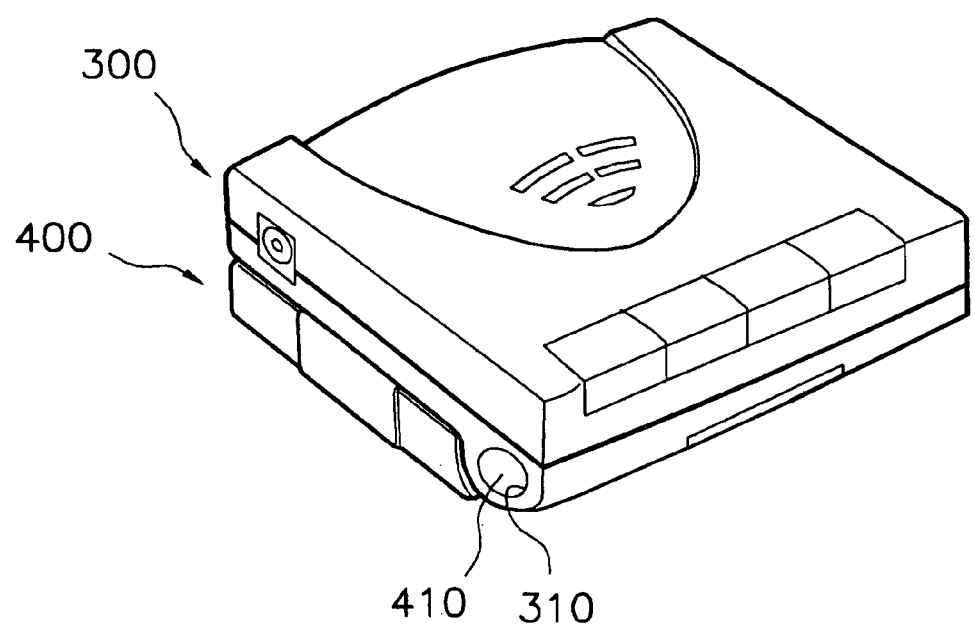
FIG. 3 is a perspective view showing an embodiment of coupling between an upper case and a lower case of the separable radar detector of the present invention.

As shown in the figure, each of the upper case 300 and the lower case 400 is constructed of two separate parts to be coupled to each other. Preferably, the upper and lower cases 300 and 400 are coupled to each other, as shown in FIG. 3, by means of hinge holes 310 formed at side ends of either the upper case 300 or the lower case 400, and protrusions 410 inserted into the hinge holes 310 to enable the upper and lower cases 300 and 400 to be moved with respect to each other, so that a user can move the upper and lower cases 300 and 400 with respect to each other at a desired angle (FIG. 3 shows an embodiment in which the hinge holes are formed at the upper case).

Figure 4:
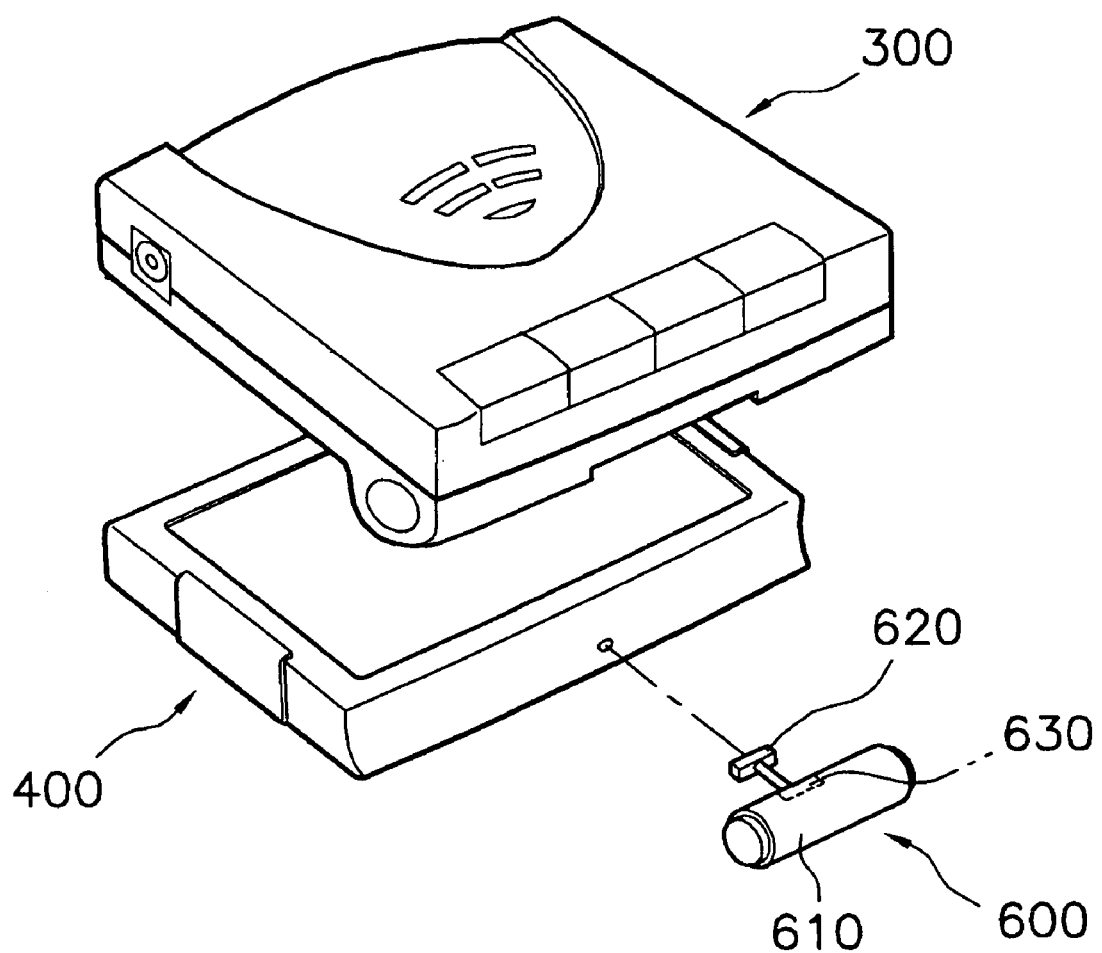
FIG. 4 is a perspective view showing another embodiment of coupling between an upper case and a lower case of the separable radar detector of the present invention.

As another embodiment, the upper and lower cases 300 and 400 may be coupled to each other, as shown in FIG. 4, using a rotational coupler 600 comprising a rotational shaft 610 installed in one of the upper and lower cases 300 and 400 and having an electrical wire contained therein, and a fixing portion 620 extending from the rotational shaft 610 and fixedly inserted into the other case, so that the upper and lower cases 300 and 400 can be moved and rotated with respect to each other.

Meanwhile, the rotational shaft 610 and the fixing portion 620 of the rotatable coupler 600 for coupling the upper cases 300 to the lower case 400 may be connected to each other by means of a connector 630, so that the upper and lower cases 300 and 400 can be detachably coupled to each other. Thus, the upper and lower cases 300 and 400 can be attached to and detached from each other.

Figure 5:
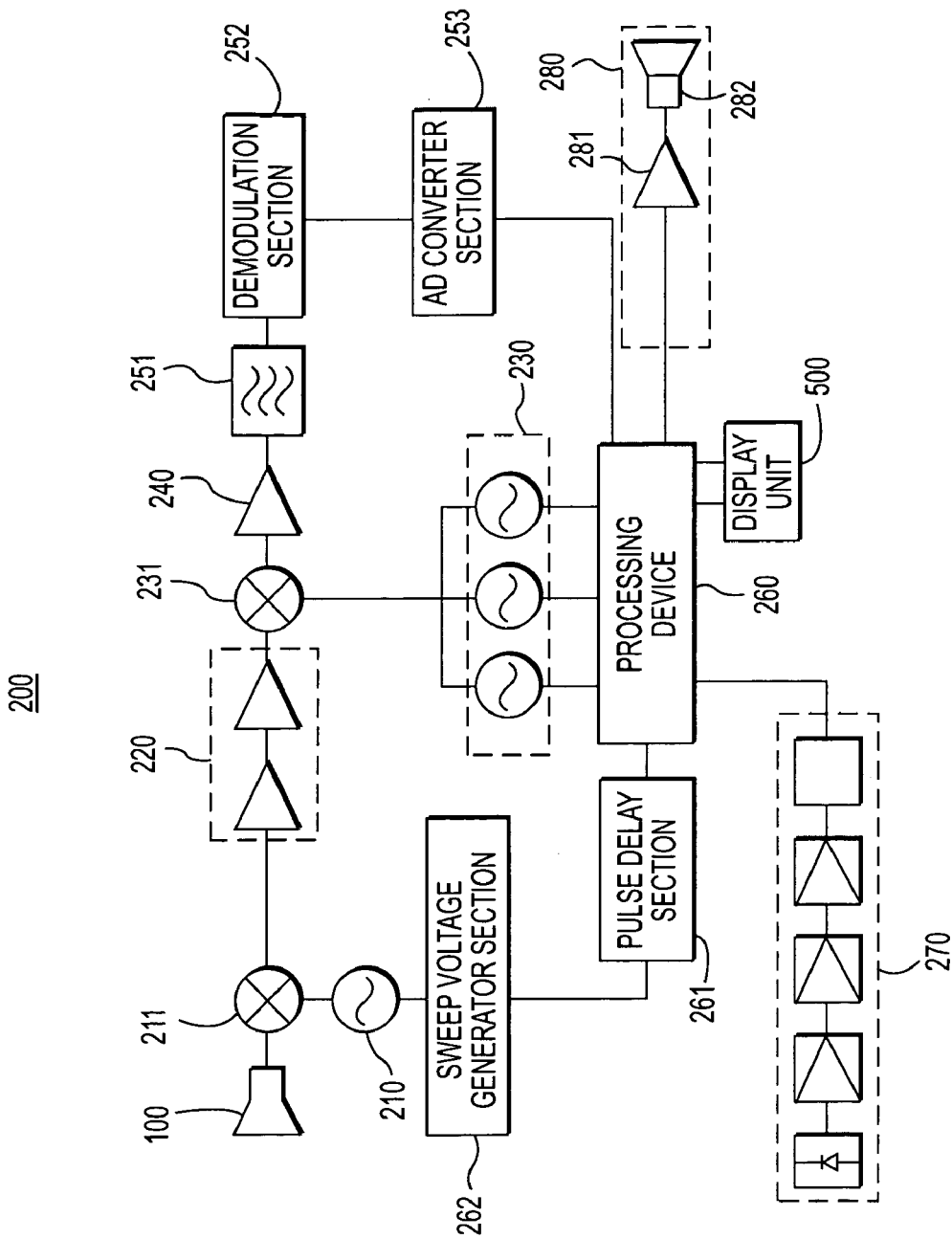
FIG. 5 is a block diagram showing an embodiment of a signal-processing unit of the separable radar detector of the present invention.

FIG. 5 is a block diagram showing an embodiment of a signal-processing unit of the separable radar detector of the present invention. Specifically, the signal-processing unit 200 comprises a first local oscillator section 210 constituting an oscillator cavity enabling oscillation in a wide range of frequency bands; a first amplifier section 220 for amplifying oscillator signals of the first oscillator section 210 that have been mixed within a first mixer section 211; a second local oscillator section 230 for individually oscillating respective frequencies of 300 MHz, 1380 MHz and 2085 MHz and capable of continuously and alternately performing oscillation irrespective of the presence of a received signal; a second amplifier section 240 for amplifying oscillator signals of the second local oscillator section 230 that have been mixed within a second mixer section 231; a filter section 251 for selectively passing the signals amplified by the second amplifier section 240; a demodulator section 252 for detecting the signals that have passed through the filter section 251; and an AD converter section 253 for converting the detected signals into digital signals.

In addition, the signal-processing unit 200 further comprises a central processing device 260 for controlling the driving of the first and second local oscillator sections 210 and 230 by measuring and calculating the periods and amplitudes of the digital signals to analyze and output the bandwidth and information of the signals and by generating pulses to find the types and information of the signals with time; a pulse delay section 261 for delaying or maintaining the pulses received from the central processing device 260; and a sweep voltage generator section 262 for driving the first local oscillator section 210 by generating a voltage from the pulse delay section 261.

To such a configuration, it is possible to further add a laser module 270 for receiving laser signals, and a voice output means 280 for outputting the detected signals to a speaker 282 via a sound amplifier section 281.

Figure 6:
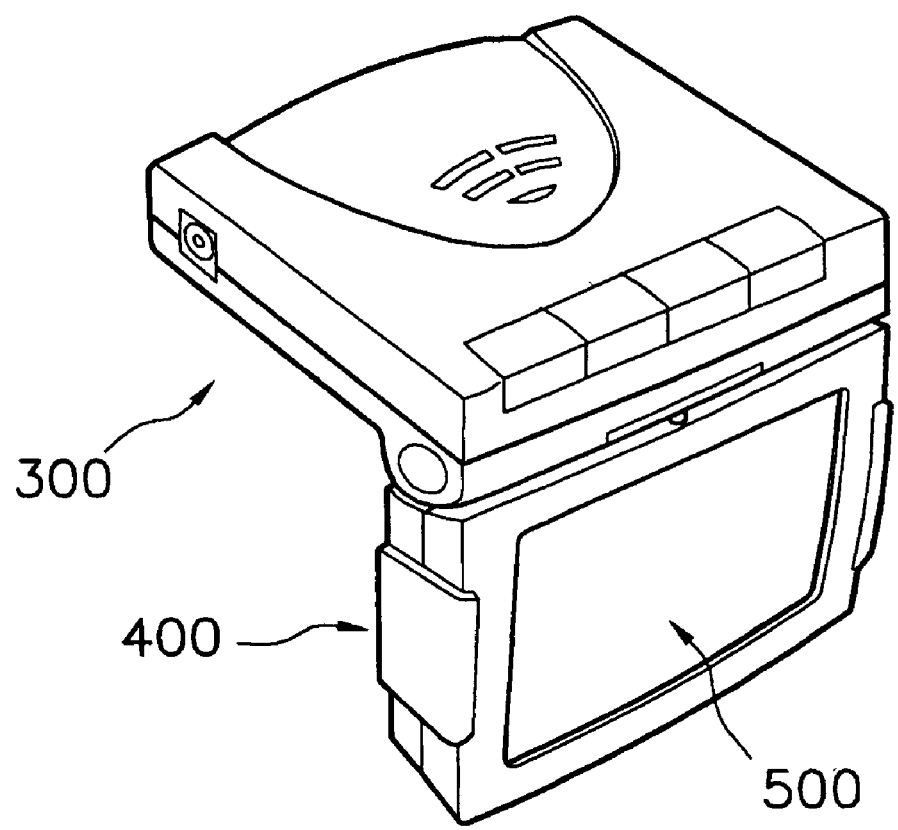
FIGS. 6 and 7 are perspective views showing use states of the separable radar detector of the present invention.
Figure 7:
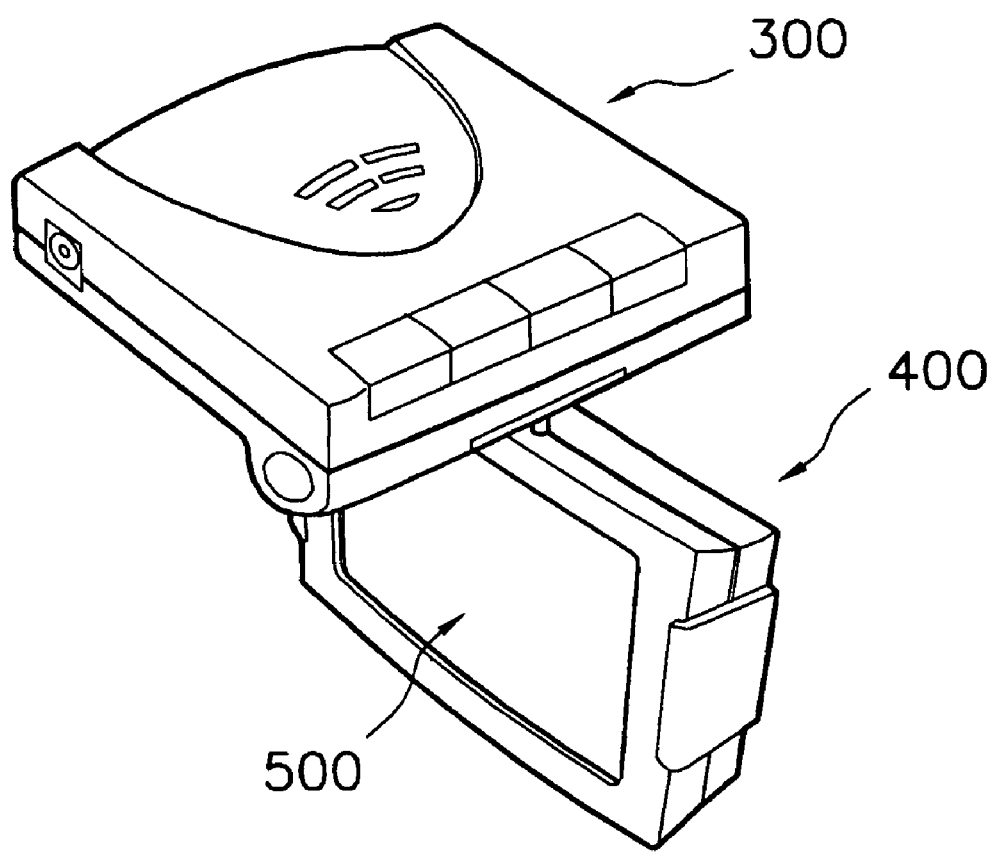

FIGS. 6 and 7 are perspective views showing use states of the separable radar detector of the present invention. The operation and effects of the present invention will be described below with reference to FIGS. 2 to 7.

As described above, the case of the radar detector of the present invention is divided into the upper and lower cases 300 and 400, the upper case 300 is constructed to contain the horn antenna 100 and the signal-processing unit 200, the lower case 400 is constructed to contain the display unit 500, and the upper and lower cases 300 and 400 are coupled to be moved, rotated or separated with respect to each other.

The upper and lower cases 300 and 400 are coupled by means of both or either of the coupling using the hinge holes 310 and the protrusions 410 and the coupling using the rotational coupler 600 to facilitate the movement and rotation of the cases with respect to each other. The connector 630 is provided in the rotational coupler 600 to facilitate the separation of the cases from each other. However, it will be apparent that the cases can be separated from each other without the connector 630.

Therefore, in a case where the radar detector is normally used while being attached to the inner side of a windshield of a vehicle or installed on a crush pad, the upper and lower cases 300 and 400 are installed to define an angle of about 90 degrees therebetween, as shown in FIG. 6. If a signal is detected, the radar detector informs a driver and a passenger of the detection of the signal using the display unit 500 or the voice output means 280.

However, the radar detector can also be used in the folded state as shown in FIG. 3. At this time, the voice output means 280 would become a main notification means.

Meanwhile, if the cases of the radar detector are arranged at a certain angle like the forgoing so that the display unit 500 can be viewed, the lower case 400 can be rotated according to the installation position of the radar detector so that the display unit 500 is placed at a position where the display unit can be viewed best, as shown in FIG. 7.

Further, since the display unit 500 can employ a large, flat display device such as an LCD, it enables the use of a variety of additional functions such as a GPS, a clock, an electronic compass, a thermometer, an accelerometer and a TV that are difficult to be implemented in conventional radar detectors.

According to the present invention described above, a large, flat display device can be employed and the angle of a display unit can be adjusted. Therefore, there are advantages in that a user can view the display unit in an optimum state and utilize additional functions that are difficult to be implemented in conventional radar detectors.

The embodiments are merely examples for specifically describing the technical spirit of the present invention. The scope of the present invention is not limited to the embodiment or the accompanying drawings.

What is claimed is:

1. A separable radar detector, comprising:
   a horn antenna;
   a signal-processing unit for processing signals received by the horn antenna;
   an first case for accommodating the horn antenna and the signal-processing unit;
   a second case connected to the first case, the second case being rotatable with respect to the first case, and the second case being separable from the first case; and
   a display unit connected to the signal-processing unit and installed in the lower second case to inform a user of the received signals processed by the signal-processing unit.

2. The separable radar detector as claimed in claim 1, wherein the display unit comprises a flat display device.

3. The separable radar detector as claimed in claim 1, wherein the first and second cases are coupled to each other by means of hinge holes formed at side ends of either the first case or the second case, and protrusions inserted into the hinge holes to enable the first and second cases to be moved with respect to each other.

4. The separable radar detector as claimed in claim 1, wherein the first and second cases are coupled to each other using a rotational coupler, the rotational coupler comprising a rotational shaft installed in one of the first and second cases and having an electrical wire contained therein, and a fixing portion extending from the rotational shaft and fixedly inserted into the other case, whereby the first and second cases can be moved and rotated with respect to each other.

5. The separable radar detector as claimed in claim 4, wherein the rotational shaft and the fixing portion of the rotational coupler are connected to each other by a connector so that the first and second cases are detachably coupled to each other.

6. The separable radar detector as claimed in claim 1, wherein the signal-processing unit comprises:
- a first local oscillator section integrally installed at a side of the horn antenna,
- a first amplifier section for amplifying signals obtained by mixing all signals received by the horn antenna with a first local frequency generated by the first local oscillator section within a first mixer section,
- a second local oscillator section with three oscillators for oscillating individual frequencies,
- a second amplifier section for amplifying signals obtained by mixing the signals amplified by the first amplifier section with a second local frequency generated by the second local oscillator section within a second mixer section,
- a filter section for selectively passing the signals amplified by the second amplifier section,
- a demodulator section for detecting the signals that have passed through the filter section,
- an AD converter for converting the detected signals and digital signals,
- a central processing device for controlling the driving of the first and second local oscillator sections by measuring and calculating the periods and amplitudes of the digital signals to analyze and output the bandwidth and information of the signals and by generating pulses to find the types and information of the signals with time,
- a pulse delay section for delaying or maintaining the pulses received from the central processing device,
- a sweep voltage generator section for driving the first local oscillator section by generating a voltage from the pulse delay section, and
- a laser module integrated with the horn antenna to receive laser signals.

7. The separable radar detector as claimed in claim 1, wherein the display unit comprises:
- a liquid crystal display,
- a controller for driving the liquid crystal display, and
- a window positioned over the liquid crystal display to protect the liquid crystal display.

* * * * *

UNITED STATES PATENT AND TRADEMARK OFFICE
CERTIFICATE OF CORRECTION

PATENT NO. : 7,205,925 B2  
APPLICATION NO. : 11/051635  
DATED : April 17, 2007  
INVENTOR(S) : Jae Kyoo Park et al.

Page 1 of 1

It is certified that error appears in the above-identified patent and that said Letters Patent is hereby corrected as shown below:

Claim 1, Column 4, line 54, "an first" should read -- a first --.

Claim 1, Column 4, line 60, "the lower second" should read -- the second --.

Signed and Sealed this

Twenty-fifth Day of September, 2007

JON W. DUDAS  
*Director of the United States Patent and Trademark Office*